E. Kauffman,
Ice Pitcher,
No. 3,194, Reissued Nov. 17, 1868
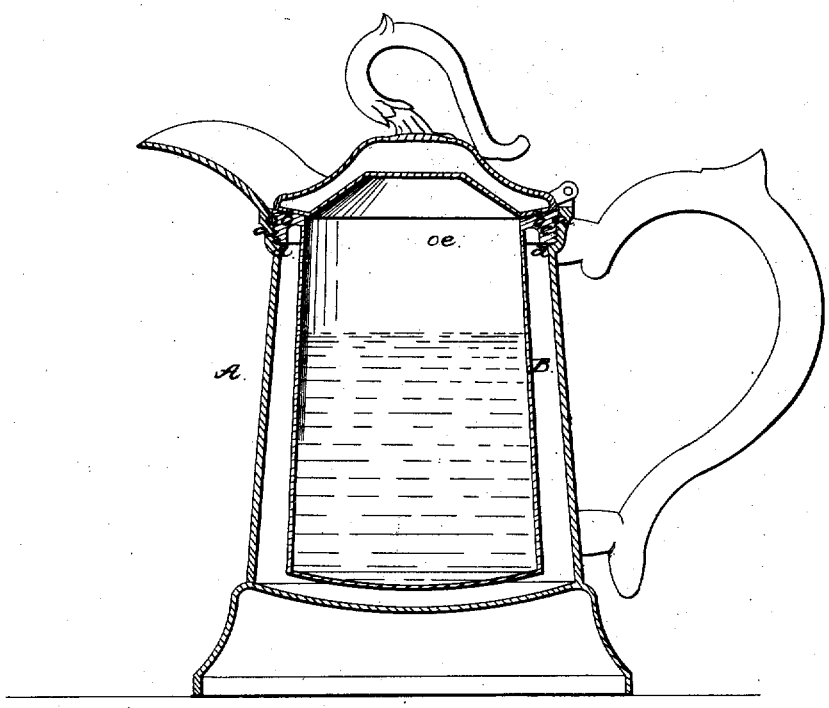
N. PETERS, PHOTO-LITHOGRAPHER, WASHINGTON, D. C.

United States Patent Office.

HENRY G. REED, GEORGE BRABROOK, AND HENRY H. FISH, (TRADING AS "REED & BARTON,") OF TAUNTON, MASSACHUSETTS, ASSIGNEES OF ERNEST KAUFFMAN.

*Letters Patent No.* 19,855, *dated April* 6, 1858; *reissue No.* 3,194, *dated November* 17, 1868.

IMPROVED ICE-PITCHER.

The Schedule referred to in these Letters Patent and making part of the same.

*To all whom it may concern:*

Be it known that we, HENRY G. REED, GEORGE BRABROOK, and HENRY H. FISH, (trading as "Reed & Barton,") assignees of ERNEST KAUFFMAN, of Taunton, in the county of Bristol, and State of Massachusetts, are the owners of a new and useful Improvement in Ice-Pitchers; and we do hereby declare that the following is a full, clear, and exact description of the same, reference being had to the accompanying drawing, forming part of this specification, the said drawing representing a vertical central section of a pitcher embodying the aforesaid improvement.

This invention relates to that description of ice-pitcher which is surrounded with a hollow jacket, or, in other words, is provided with double bottom and sides.

Such pitchers, as usually constructed, have the inner part or lining soldered, or otherwise permanently attached at the top to the outer part or casing, and, in consequence, when the inner part or lining is worn through, or accidentally perforated, as it generally is, while the outer part or casing remains good, there is no or very little facility for renewing or repairing it, and the pitcher becomes, in a measure, worthless.

This invention, therefore, consists in so constructing the pitcher that the inner part or lining may, at any time, be readily inserted or removed for making repairs, cleaning, and other purposes, without the necessity of taking the pitcher apart, or removing any part thereof.

To enable others to make and use the aforesaid in-invention, we will proceed to describe the method of its application.

A is the outer portion or casing of the pitcher, which may be made of any form to suit the taste, and has a female-screw thread, *a*, cut in the interior of its upper rim.

B is the inner portion or lining, having formed around the exterior of its mouth a flanch, *b*, of a sufficient size to close the space C between the outer casing A and inner casing B, and having a male-screw thread, *c*, cut upon the periphery of its flanch *b*, to screw tightly into the female screw *a*, and having the lower edge of the flange formed with a valve-like face, to fit a seat, *d*, below the female screw of the casing.

The lining B should have two holes, *e*, opposite each other, to receive a horned wrench, or be otherwise formed or provided with means of applying a wrench to screw it tight down to the seat *d* of the casing, and unscrew it therefrom when necessary.

When the lining, thus constructed, is screwed tightly into the casing, a perfectly-tight joint is formed between them, though it can be readily taken out, and spare linings being kept on hand and supplied by the manufacturer, a worn-out or damaged one, it is obvious, may be taken out and replaced by a new one in a few minutes, and at small cost.

What we claim as the invention of ERNEST KAUFFMAN, and desire to secure by Letters Patent, is—

1. An ice-pitcher, having an attachable and removable lining, and a continuous or unbroken outer wall and bottom, when so constructed that the lining can be attached or removed through the top of the pitcher.

2. The ice-pitcher, having the inner portion or lining B, fitted to the outer portion or casing A, with screw-threads, or their equivalents, which make a tight joint, but provide for its ready removal and renewal, and replacement or renewal, as set forth.

HENRY G. REED.
GEORGE BRABROOK.
HENRY H. FISH.

Witnesses:
J. H. RINES,
WILLIAM W. SWAN.